Aug. 4, 1970  J. H. O. SMERD ET AL  3,522,875
CONTINUOUS CHAIN SCRAPER ASSEMBLIES
Filed Dec. 18, 1967  2 Sheets-Sheet 1

Inventors:
Johann Hans Otto Smerd
and
Paul Arthur Collier
By Baldwin Wight Diller & Brown
Attorneys

Aug. 4, 1970     J. H. O. SMERD ET AL     3,522,875
CONTINUOUS CHAIN SCRAPER ASSEMBLIES

Filed Dec. 18, 1967     2 Sheets-Sheet 2

Inventors:
Johann Hans Otto Smerd
and
Paul Arthur Collier
By Baldwin, Wight, Diller & Brown
Attorneys

United States Patent Office 3,522,875
Patented Aug. 4, 1970

3,522,875
CONTINUOUS CHAIN SCRAPER ASSEMBLIES
Johann Hans Otto Smerd, Stourport-on-Severn, and Paul Arthur Collier, Rock, near Kidderminster, England, assignors to Parsons Chain Company Limited, Stourport-on-Severn, England, a corporation of the United Kingdom
Filed Dec. 18, 1967, Ser. No. 691,644
Claims priority, application Great Britain, Dec. 30, 1966, 58,407/66
Int. Cl. B65g 19/10, 19/24
U.S. Cl. 198—175
5 Claims

ABSTRACT OF THE DISCLOSURE

A connector for use in making up a chain scraper conveyor which connector comprises a member adapted for pivotal connection at one end to the scraper bar and having at its other or outer end transverse slots to receive the opposite limbs of the chain link and to which it is permanently secured.

---

This invention relates to a chain scraper assembly.

Existing scraper conveyor assemblies utilising round link chain are predominantly of a type made up of short lengths of chain joined together by means of shackle type or other connectors to which are secured scraper bars. It will be appreciated that the strength of such a chain assembly is dependent upon the breaking strength of the shackle connector and on its closing nut and bolt. The object of this invention is to provide a clamp-on form of connector for fixedly securing the scraper bar directly to the links of the chain with the consequent advantage that continuous lengths of chain can be used in the assembly.

According to this invention a connector device for use in making up a chain scraper assembly comprises a member which is connected at one end to the scraper bar and slotted transversely at its other end to permit of interengagement with a chain link and of securing it thereto. The same end of the connector member may conveniently be shaped so as to perform other functions of the connector device, e.g. guiding the chain assembly in relation to the pan.

In carrying out the invention the connection between the connector member and the scraper bar is by means of a vertical pivot pin, the connector member at its outer or head end being formed with two transverse grooves which are of a depth and spaced apart to accommodate the side limbs of the chain link.

In a preferred embodiment the connector member consists of a short bar having an enlarged head, in the under side of which are two grooves, the web of metal separating the inner and outer grooves being extended to form a projecting limb which can be bent over to overlie the side limb of the link and secure it in position. In side elevation (considering the upper run of the chain) the design of the head is in the form of a T with the two grooves lying on opposite sides of the stem of the T.

The invention is illustrated in the accompanying drawings in which.

Figure 1:
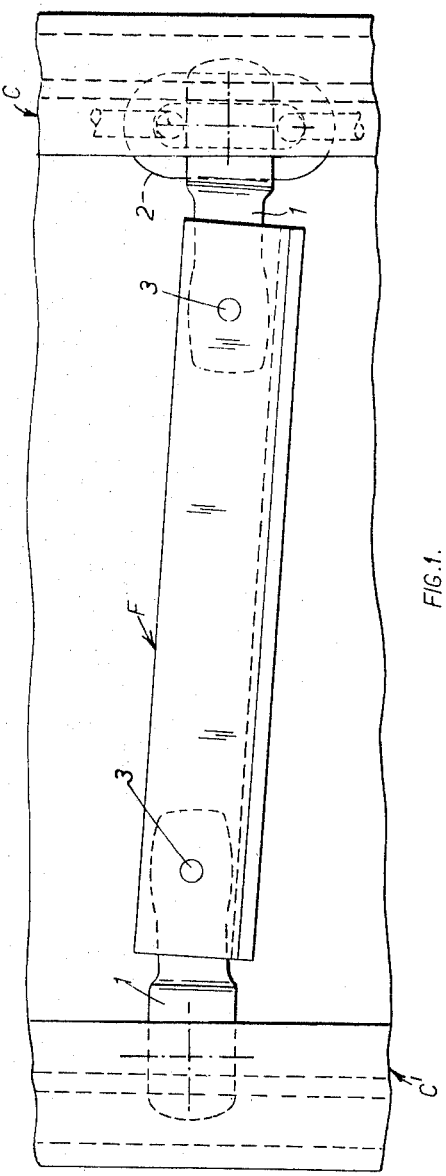
FIG. 1 is a plan view of a flight bar of a scraper conveyor fitted with connectors in accordance with the invention.

In the drawings the scraper conveyor comprises two endless chains indicated by the centre lines C, C1, F being a flight bar which is connected at each end by connectors, indicated generally at 1, to the link 2 of the chain C.

The connector 1 of this invention is pivotally anchored by means of a pin 3 to the scraper bar so as to be capable of pivotal movements in a horizontal plane for which purpose the end of the flight bar F is formed with a recess. At its other end the connector is formed with a head 4 in one side of which are transverse grooves or slots 5 and 6, the intervening web of metal providing a tongue 7 so that the head, when seen in side elevation (considering the upper run of the chain) is in the form of a T with the two grooves 5 and 6 on opposite sides of the stem 7.

The size of the groove 5 is such that it is a clearance fit on the outside limb of the chain link 2 and having engaged the outer groove 5 with the chain the link is swung so as to engage the other and inner limb into the other and inner groove 6. It should be noted that the tongue 7 is bent outwardly and that the two sides of the slot 5 are at an angle to the vertical and also that the inner surface of the tongue 7 is formed to a radius about a centre coinciding with the axis of the outer limb of the link.

Having located the link in the grooves 5 and 6 the extended limb 8 is bent so as to close the groove 6 when the connector will be securely and permanently clamped to the chain.

Should additional tightness be required, the groove sizes are so dimensioned that the chain will have to be pressed into position and a riveting effect given to the centre locating limb to press it more firmly on the outer side of the chain link.

Figure 3:
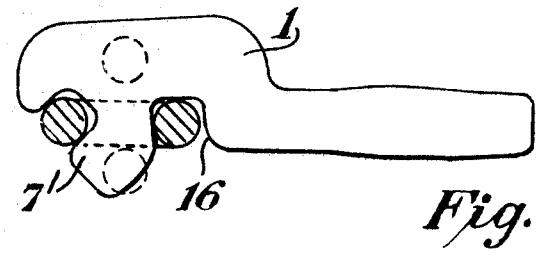
FIGS. 3 and 4 are detailed views of connectors formed in accordance with two alternate embodiments of the invention.

As an alternative means of securing the connector member to the link it is possible:

(a) to shape the connector member such that the chain link is distorted elastically and sprung into position. In this method the centre limb or tongue 7 is so constructed that at one point its width is greater than that of the distance separating the two limbs of the chain link so that the inside limb (indicated at 7' in FIG. 3) of the chain has to be sprung over this point of maximum width to sit finally in the groove 16 having first sprung it into position in the outer groove 5.

Figure 4:
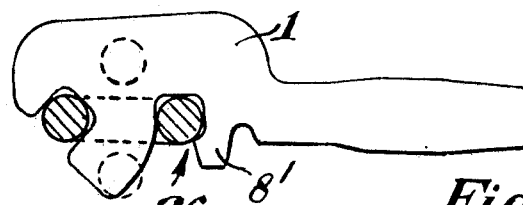

(b) to shape the connector member such that it is sprung on to the chain. In this arrangement the entrance, indicated at 26 (see FIG. 4) to the inner groove 6, i.e. the distance between the radiused face 7 of the tongue and the opposite side of limb 8, is less than the wire diameter of the chain, the inner limb 8' being modified so that it is shorter than the limb 8 of FIG. 2 and such that it will yield elastically as the chain link is forced into the inner groove 6 thus securely clamping the connector bar to the chain.

The upper side of the head of the connector member is preferably formed with a flat wear surface 10 which is set at an angle to correspond with the angled surfaces of the guide pans. This enables the effective wear area to be relatively increased to restrict chain wear in the bottom race for the return run of the chain.

By having the scraper bar fitted with vertical pivot pins 3 it is possible to obtain horizontal flexibility and design a bar which can have good horizontal depth to obtain strength. It will not contain the disadvantages of excessive vertical displacement, but can be designed to clear the pan joints in the bottom race without the need for vertical float relative to the chain which is achieved by designing the assembly so that the chain links take up a position relative to the bottom scraping edge of the scraper bar similar to that adopted with a floating connector.

Figure 2:
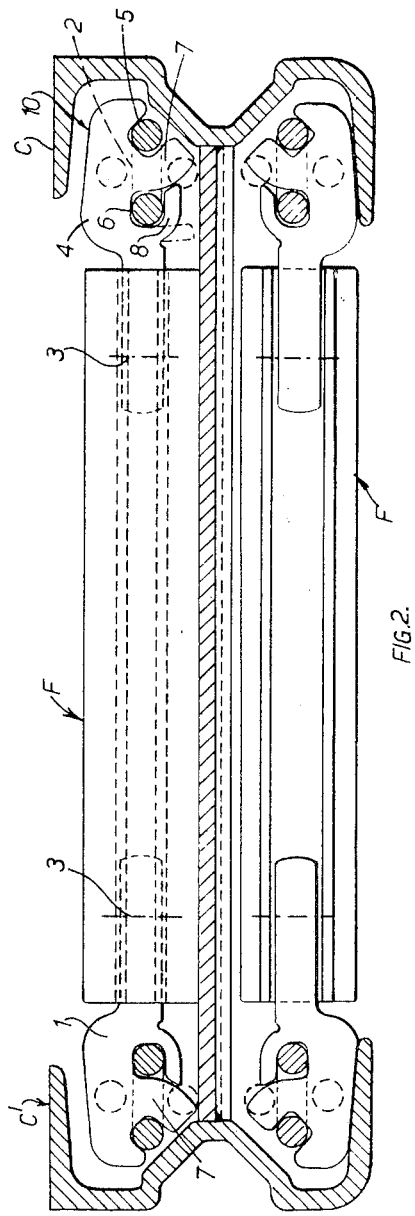
FIG. 2 is a transverse sectional view showing the upper and lower runs of the scraper conveyor including the pan and scraper bars having connectors in accordance with the invention.

As can be seen from FIG. 2, the design of the outer end of the connector bar is such that it does not affect the part of the chain link which seats itself in the drive sprocket. This has the advantage that the sprocket drive faces can be designed to suit chain links only, not chain links and connectors.

Scraper chain assemblies when made up with the connector device of this invention have the advantage over existing methods of avoiding shackle type connectors where chain is manufactured into a closed connector which is basically a chain link with a scraper bar attachment system manufactured as a single unit, in that the fitting of costly joiner links and individual heat treatment is avoided.

As the direct conveying load is not transmitted through the connector member a single connector member can be used regardless of chain quality.

The method of attachment of the connector device also overcomes the problem of shackle type connectors doubling up vertically on the end of the scraper bar and thus dropping out of the bottom race of the conveyor with the resultant need to lift the entire conveyor to put the chain back in.

It also eliminates any additional loading being transferred from the connector to the chain, due to its natural ability to articulate horizontally in the scraper bar when the conveyor is "snaked" or if the conveyor is not straight.

What is claimed is:

1. In a chain scraper conveyor assembly having two chain runs and scraper bars connected at their ends to selected links of the chain runs by connectors, the improvement comprising the formation of each connector as a one-piece member, said member being formed with a pair of transverse slots which receive opposite chain limbs of an associated chain link, said slots being bounded by a central tongue and inner and outer integral limbs, and one of said last-mentioned limbs being deformed to at least partially close the slot adjacent thereto to enslave the chain limb therein between said one limb and the central tongue whereby wear is confined solely to relative movement between the connectors and the associated links.

2. The chain scraper conveyor assembly as defined in claim 1 wherein said one deformed limb is said inner limb.

3. In a chain scraper conveyor assembly having two chain runs and scraper bars connected at their ends to selected links of the chain runs by connectors, the improvement comprising the formation of each connector as a one-piece member, said member being formed with a pair of transverse slots which receive opposite chain limbs of an associated chain link, said slots being bounded by a central tongue and inner and outer integral limbs, said central tongue including a reduced neck and an enlarged terminal end portion, and the maximum width of said central tongue terminal end portion is greater than the distance between the chain limbs whereby said central tongue terminal end portion enslaves the chain link upon said reduced neck whereby wear is confined solely to relative movement between the connectors and the associated links.

4. In a chain scraper conveyor assembly having two chain runs and scraper bars connected at their ends to selected links of the chain runs by connectors, the improvement comprising the formation of each connector as a one-piece member, said member being formed with a pair of transverse slots which receive opposite chain limbs of an associated chain link, said slots being bounded by a central tongue and inner and outer integral limbs, and the maximum width of one of said slots as measured between one of said inner and outer limbs and said central tongue is less than the diameter of a chain limb received therein thereby enslaving the chain limb between said one limb and the central tongue whereby wear is confined solely to relative movement between the connectors and the associated links.

5. The chain scraper conveyor assembly as defined in claim 4 wherein said one slot is defined between said central tongue and the inner one of said inner and outer limbs.

References Cited

FOREIGN PATENTS

| 529,620 | 6/1956 | Germany. |
| 864,296 | 3/1961 | England. |
| 808,036 | 7/1951 | Germany. |

EVON C. BLUNK, Primary Examiner

R. S. GAITHER, Assistant Examiner

U.S. Cl. X.R.

198—176